3,753,933
POLYURETHANE FOAMS FROM SOLID FOAMING AGENTS

Franciszek Olstowski, Freeport, and Donald B. Parrish, Lake Jackson, Tex., assignors to The Dow Chemical Company, Midland, Mich.
No Drawing. Filed Apr. 24, 1972, Ser. No. 247,030
Int. Cl. C08g 22/44
U.S. Cl. 260—2.5 AE                                    12 Claims

ABSTRACT OF THE DISCLOSURE

Polyurethane foams are prepared from a polyol and an organic polyisocyanate employing as the foaming agent a solid particulate substance having a decomposition or dehydration temperature above about 250° C., a minimum dimension particle size of less than 2 millimeters, and a surface area of at least 0.2 square meters per gram. Such foaming agents include metal powders, organic polymer powders and inorganic compounds.

---

This invention relates to polyurethane foam compositions and more particularly relates to a process for preparing polyurethane foams.

Polyurethane foams have usually been prepared (1) by mixing the polyurethane-forming components with a low boiling compound which vaporizes as a result of the exothermic urethane reaction thereby creating a foam, (2) by mixing the urethane forming components with water and the reaction between the polyisocyanate and the water releases $CO_2$ which causes a cellular product to be produced, (3) by mixing the polyurethane-forming components with a compound which decomposes to release $CO_2$ or other gas thereby producing a cellular product or (4) combinations of the above.

It has now been discovered that polyurethane foams or cellular products can be prepared by mixing the urethane forming reactants or components with a solid, high surface area, particulate powder.

The present invention comprises a polyurethane foam comprising (A) a polyhydric polyol having a average OH functionality of from 2 to about 8 and an average equivalent weight of from about 40 to about 500 and preferably from about 70 to about 300,
(B) an organic polyisocyanate having an average NCO functionality of at least about 2,
(C) as a blowing agent, a solid particulate substance having a particle size of less than about 2 mm. and preferably less than about 1 mm. in one dimension and a surface area of at least about 0.2 m.²/gram and preferably at least about 1 m.²/gram.

wherein components (A) and (B) are present in quantities so as to provide an NCO to OH ratio of from about 0.8 to about 1.5 and preferably from about 0.9 to about 1.2 and with the proviso that when component (A) has a functionality of about 2, then component (B) has an average functionality of at least about 2.5 and when component (B) has a functionality of 2, then component (A) has an average functionality of at least about 3, and wherein component (C) is employed in quantities of from about 1 to about 80 and preferably from about 4 to about 60 percent by weight of the combined weights of components (A) and (B).

Suitable polyols which are employed in the present invention as component (A) include polyester and polyether polyols.

Suitable polyether polyols include the oxyalkylated derivatives of a polyhydric compound having 2 or more reactive hydroxyl groups such as, for example, ethylene glycol, propylene glycol, glycerine, trimethylol propane, pentaerythritol, sucrose, novolac resins, p,p'-isopropylidine diphenol, mixtures thereof and the like.

Other suitable polyols include the oxyalkylated derivatives of an amine compound such as, for example, ammonia, ethylenediamine, propylenediamine, 1,6-hexanediamine, diethylenetriamine, triethylenediamine, tetraethylenepentamine, mixtures thereof and the like.

Suitable oxyalkylating agents which are reacted with the hydroxyl-containing or amine-containing compounds or mixtures thereof, include for example, such vicinal epoxides as ethylene oxide, propylene oxide, 1,2-butylene oxide, 2,3-butylene oxide, epichlorohydrin, epibromohydrin, styrene oxide, butylglycidyl ether, phenylglycidyl ether, mixtures thereof and the like.

Suitable polyester polyols include those hydroxyl terminated reaction products of a diabasic acid or anhydride such as, adipic acid, maleic acid, phthalic acid, their anhydrides, mixtures thereof and the like with a glycol, i.e. a dihydroxyl containing compound such as, for example, ethylene glycol, propylene glycol, 1,4-butane diol, 1,6-hexane diol, mixtures thereof and the like.

Suitable polyisocyanates which may be employed as component (B) in the compositions of the present invention include, for example, any organic polyisocyaate having 2 or more NCO groups per molecule and no other substituents capable of reacting with the hydroxyl groups of the polyol. Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene® W), naphthalene diisocyanate, dianisidine diisocyanate, polymethylene polyphenyl-isocyanate, mixtures of one or more polyisocyanates and the like.

Other organic isocyanates which may suitably be employed and which are to be included in the term "organic polyisocyanate" include isocyanate terminated prepolymers prepared from the previously mentioned polyols and the above mentioned isocyanates.

Suitable solid particulate substances which may be employed in the process of the present invention as component (C) are any such compound which is substantially insoluble in either component (A) or (B) or both, do not decompose into gaseous products below about 150° C., and which have a particle size in its minimum dimension of less than about 2 millimeters and preferably less than about 0.2 millimeter and a surface area as determined by nitrogen absorption by the Brunauer, Emmet, and Teller (B.E.T.) (JACS, vol. 60, pp. 309–319, 1938) method employing a Perkin-Elmer Shell Model 212D Sorptometer of at least about 0.2 square meters per gram and preferably at least about 1 square meter per gram.

The term particle size in its minimum dimension means that one of its dimensions is less than 2 millimeters and preferably less than 1 millimeter.

The particles can be in the shape of rods, fibers, spheres, flakes or the like or they can be irregular in shape.

Suitable such particulate solids which are employed as blowing agents in the present invention include, for example, (a) Metallic elements or non-metal elements such as aluminum powder, iron powder, copper powder, graphite or carbon powder, powdered sulfur, powdered silicon, and powdered phosphorus.

(b) Metallic alloys or metaloid powders such as bronze powders, silicon carbide powders, iron sulfide powders, (c) Inorganic compounds such as silicon dioxide in its various natural or manufactured forms (diatomaceous earth, fumed silica), boron nitride powder, calcium carbonate (such as in the form of fine limestone powder or marble dust), alumina (fumed), aluminum silicates (in the form of various clays), magnesium silicates in the form of talc or complex silicates in the form of mica, (d) Naturally occurring organic solid substances formed into powders during processing such as powdered rosin, wood flour, pecan shell flour, cellulose powders or chemically reacted cellulose such as Methocel®, ultrafine confectioners sugar, cereal grain flours such as wheat, rice, corn, mixtures thereof and the like, (e) Powdered synthetically produced polymers such as ultrafine polyethylene powder, polypropylene powder, polyvinyl chloride molding powder, ultrafine nylon powder, powdered polystyrene, phenol formaldehyde powder, ultrafine polypropylene powder, ultrafine fluorinated polymers.

The amounts of "blowing" powder that can be added to the liquid blend of the urethane reactants can range from about 1 wt. percent up to about 80 wt. percent of the total formulation depending on such factors as the amount of "blowing" or foaming desired. Generally, and within limits, the more blowing agent added the lower the density of the product foam. The density and liquid sorption capacity of the "blowing" powders also affects the quantities which can be employed. For example, iron powder has a high bulk density and a relatively low liquid sorption capacity so that formulations containing more than 50 wt. percent iron are easily processed as a castable fluid—before polymerization occurs. On the other hand, fumed silica or fumed alumina have extremely low bulk densities and, therefore, concentrations of these agents above a few weight percent of the total formulation results in blends that are extremely viscous or mixtures that are difficult to process as fluids or unprocessable wetted solids.

These powdered agents, in addition to having the ability to expand the polymerizing urethane reactants, also serve as particulate nucleating agents for the gas cells that are forming and this in many cases eliminated or minimized the need for supplemental surface active agents and cell control agents frequently necessary in other methods used to "blow" or foam polyurethane reactions. However, in some instances, it may be desirable to add a suitable cell control agent such as the silicone oils.

The degree of "blowing" (i.e., increase in volume) yielded by these powdered agents is generally proportional to the total surface area per unit mass for that substance. However, the degree of "blowing" or expansion for an identical mass of powdered agent having the same specific surface area but different chemical identity is not necessarily the same. Generally, substances that are hydrophilic in nature appear to yield a greater degree of blowing for a given concentration of powdered agent than do substances which appear to be more hydrophobic in nature.

High surface agents that have the ability to yield very low density foams (say, below 5 lbs./cubic ft. density) but have an insufficient number of nucleating sites, (i.e., an insufficient number of particles) will yield a foamed product having relatively large gas cells.

If it is desired to have a foamed product having a fine (small) gas cell structure, an ultrafine powder having a lesser ability to "blow" the product foam, can be blended with a high "blowing ability" agent to increase the number of nucleating sites and reduce the size of the gas cells.

If desired, surface active agents or emulsifiers may be employed to control the gas cell size or structure, open or closed cells, of the foam.

The end use of the foamed product often suggests the type of blowing agent to be used. For example, if the foam is required to possess magnetic properties, it can be blown with powdered iron, powdered nickel metal, or other powdered alloys or substances exhibiting magnetic properties.

If the foamed product is to be used as an abrasive wheel or surface or a polishing wheel or surface, the reacting mixture can be "blown" or expanded with ultrafine alumina or silicon carbide powders. If the foam is required to exhibit fire retardant properties, it may be expanded with such agents as powdered phosphates, bromides or bromine containing substances or a synergistic mixture of antimony salts and halogen containing substances.

The compositions of the present invention may also cotain other modifiers including fire retardant agents such as, for example, tris(2-chloroethyl)phosphate, tricresyl phosphate, tris(2,3-dibromopropyl)phosphate, mixtures thereof and the like.

When the polyol employed as component (A) does not contain tertiary amine groups, a catalyst for urethane formation is required including any of the well known metal salts such as, for example, dibutyltin dilaurate, stannous octoate, lead octoate, mercury naphthenate, lead naphthonate, lead oleate, and the like or tertiary amines such as, for example, triethylenediamine or mixtures thereof and the like.

The amine initiated polyols such as triethanol amine or the adduct of propylene oxide onto ethylene diamine or diethylene triamine reacting with polyisocyanates do not require the presence of an added catalyst since the urethane reaction is self-catalyzed.

With some particulate blowing agents the very short apparent induction time exhibited by a large concentration of such rapid catalysts as lead octoate, lead naphthenate or lead oleate may yield an insufficiently "blown" or expanded product. In this case, more effective expansion will result is the "rapid" catalyst such as lead octoate is diluted with such solvents as mineral oil or kerosene or if the "rapid" catalyst is replaced by an apparently "slower" catalyst such as dibutyl tin dilaurate or dibutyl tin diacetate or an amine type of urethane catalyst.

Supplemental non-reactive liquid reagents may be desired additions to these foam producing formulations. These supplemental liquids which are referred to herein as modifiers assist in forming compatible liquid mixes, or assist in dispersing the powdered blowing agents and they are used for thermal control so that scorching is minimized or eliminated from the interior of large cross section foams, or they function as plasticizers in the product foam to either decrease brittleness or decrease friability, etc. These liquid modifiers have boiling points above about 150° C. and are employed in qauntities of from about 1 to about 20 and preferably from about 5 to about 15 parts by weight based upon the weight of the total formulation.

Suitable such liquid modifier compounds include, for example, hydroxyl-containing and non-hydroxyl-containing polyoxyalkylene compounds, ester-modified polyoxyalkylene compounds, organic phosphates, organic phosphites, organic phosphonates, fatty acids, fatty oils, cyclic ethers, aromatic compounds, partially hydrogenated aromatic compounds, organic carbonates, halogenated aliphatic compounds, cyclic sulfones, esters of carboxylic acids and mixtures thereof.

Suitable polyoxyalkylene compounds which are employed as the liquid modifier compound include, for example, (1) a liquid, totally-capped or non-hydroxyl-containing block or randomly formed polyoxyalkylene glycol represented by the general formula (I)
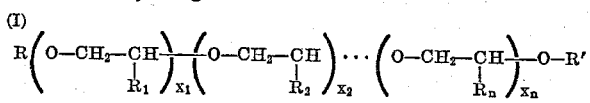

wherein R and R' are independently selected from saturated and unsaturated hydrocarbon groups having from about 1 to about 6, preferably from about 1 to about 3, carbon atoms; $R_1, R_2 \ldots$ and $R_n$ are independently hydrogen, an aryl group, an alkyl group or haloalkyl group, said alkyl or haloalkyl group having from about 1 to aboua 2 carbon atoms with the proviso that when $R_1, R_2 \ldots R_n$ is a haloalkyl group, it is present in minor amounts i.e. a ratio of from about 0 to about 10 percent of the total $R_1, R_2 \ldots R_n$ groups, and $x_1, x_2 \ldots x_n$ are integers, such that the boiling point of the liquid capped polyalkylene glycol is above about 150° C., (2) a liquid partially capped, block or randomly formed polyoxyalkylene compound represented by the general formula (II)

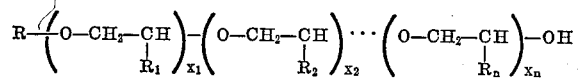

wherein R and $R_1, R_2 \ldots R_n$ are as defined in Formula I above and $x_1, x_2, \ldots x_n$ are integers, the sum of which provides the partially capped polyoxyalkylene compound with a molecular weight of at least about 700, (3) a liquid, block or randomly formed polyoxyalkylene glycol represented by the general formula (III)

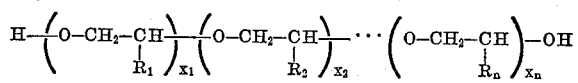

wherein $R_1, R_2 \ldots R_n$ are as defined in Formula I above and $x_1, x_2 \ldots x_n$ are integers, the sum of which provides the polyoxyalkylene glycol with an equivalent weight of at least about 700, and (4) a liquid, random or block polyoxyalkylene polyol having a hydroxyl functionality of from 3 to about 8 represented by the general formula (IV)

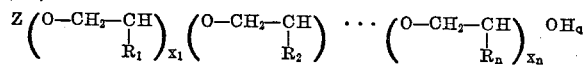

wherein $R_1, R_2 \ldots R_n$ are as defined in Formula I above, Z is the residue of an initiator compound having from 3 to about 8 hydroxyl groups, $x_1, x_2, \ldots x_n$ are integers, the sum of which provides the polyoxyalkylene polyol with a hydroxyl equivalent weight of at least about 500 and $q$ is an integer having a value of from 3 to about 8.

Suitable ester-modified polyoxyalkylene compounds which may be employed as the liquid modifier compound include, for example, those liquid ester-modified polyethers having a boiling point above about 150° C. represented by the general formula

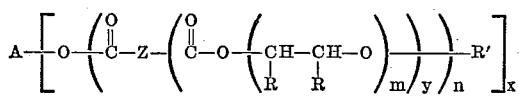

wherein A is the residue of an initiator or starting compound having from 1 to about 8 hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from 1 to 20 carbon atoms, $m$ has an average value of from about 1.0 to about 2.0, $n$ has a value from about 1 to about 5, $x$ has a value from about 1 to about 8 and $y$ has a value of 1 or 2 and wherein said ester-modified polyether compound has a hydroxyl equivalent weight above about 500 when 3 or more hydroxyl groups are present and when 2 hydroxyl groups are present, an average equivalent weight of above about 700 and when zero or one hydroxyl group is present a molecular weight of above about 700.

Suitable initiators which are employed to prepare the liquid polyoxyalkylene and ester-modified polyoxyalkylene modifier compounds employed in the present invention include compounds having from 1 to about 8 hydroxyl groups such as, for example, methanol, ethanol, propanol, butanol, ethylene glycol, propylene glycol, butylene glycol, 1,6-hexane diol, glycerine, trimethylolpropane, pentaerythritol, sorbitol, sucrose, mixtures thereof and the like.

When the liquid modifier compound is an ester modified polyether polyol, the initiator compound may also be and is preferably an adduct of the above mentioned initiator compounds and one or more of the following vicinal epoxide-containing compounds, i.e. the initiator compound is a polyoxyalkylene compound having 1 to 8 hydroxyl groups, preferably 2 to about 3 or 4 hydroxyl groups.

Suitable vicinal epoxide compounds which may be reacted with the above mentioned initiator compounds to prepare the modifier compounds employed in the present invention include, for example, ethylene oxide, 1,2-propylene oxide, 1,2-butylene oxide, 2,3-butylene oxide, epichlorohydrin, epibromohydrin, epiodohydrin, styrene oxide, mixtures thereof and the like.

The liquid modifier compounds represented by the above formula and methods for their preparation are well known in the art, e.g. U.S. 2,448,664, U.S. 2,425,755, U.S. 2,782,240 and U.S. 2,520,611. Methods for the preparation of the liquid modifier compounds represented by the Formula V are given in a copending application Ser. No. 67,233, filed Aug. 26, 1970 by Robert W. McAda, Jr. for Ester-Modified Polyether Polyols and in U.S. 3,502,601.

Suitable aromatic compounds which are employed as the liquid modifier compound having a boiling point above about 150° C. in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodobenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, β-chlorostyrene, mixtures thereof and the like.

The above compounds are represented by the following general formula provided it is understood that such compounds represented by the formula are liquids and have boiling points at atmospheric pressure above about 150° C.

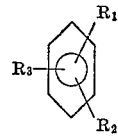

wherein $R_1$, $R_2$ and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which are employed as the liquid modifier compound in the present invention include liquid multi-ring compounds having a boiling point above about 150° C. such as, for example, 1 - chloronaphthalene, 1 - bromo-naphthalene, mixtures thereof and the like.

Suitable partially hydrogenated multi-ring aromatic compounds which are employed as the liquid modifier compound in the present invention include, for example, 1-4,dihydronaphthalene, 1,2,3,4 - tetrahydronaphthalene, mixtures thereof and the like.

Suitable organophosphorus compounds which are employed as the liquid modifier compound include, for example, organo phosphates, organo phosphites and organo phosphonates having boiling points above about 150° C.

Organo phosphates, phosphites and phosphonates which may be employed as the liquid modifier compound include those liquid compounds represented by the formulae

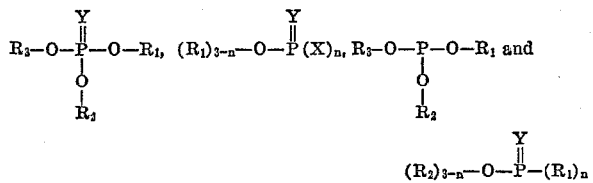

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e. chlorine, fluorine, bromine or iodine, $n$ has a value of 1 or 2. Suitable such compounds include, for example, tri-n-butyl phosphate, triethylphosphate, tricresylphosphate, tris-(beta-chloroethyl)phosphate, tris - (2,3-dibromopropyl) phosphate, butyl dichlorophosphate, 2-chloroethyl dichlorophosphate, ethyl dichlorophosphate, diethyl fluorophosphate, bis(2-chloroethyl) fluorophosphate, dibutyl chlorophosphate, isoamyl dichlorothiophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

The organo phosphorus compounds may be prepared by procedures described in Organo-Phosphorus Compounds, G. M. Kosolapoff, John Wiley and Sons, Inc., 1950.

Suitable liquid organic carbonates which may be employed as the liquid modifier in the present invention include the acyclic and cyclic carbonates represented by the formulae

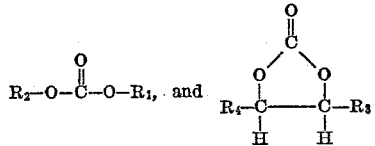

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ and hydrogen.

Suitable liquid acyclic organic carbonates which are employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonate may be prepared by procedures given in U.S. Pat. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which are employed as the liquid modifier include, for example, the cyclic tetramer of ethylene oxide, cyclic pentamer of propylene oxide, cyclic tetramer of propylene oxide, mixtures of the above and mixtures of cyclic pentamers and above of ethylene oxide and/or propylene oxide. Any liquid cyclic polyether having a boiling point above 150° C. may be employed as the liquid modifier in the present invention including cyclic polyethers prepared from butylene oxide, epichlorohydrin and the like.

The liquid cyclic polyether modifier compounds can be prepared by procedures mentioned in Cyclic Polyethers and Their Complexes With Metal Salts by C. J. Pedersen, J. Am. Chem. Soc., Vol. 89, pp. 7017–7036, 1968, Twelve-Membered Polyether Rings. The Cyclic Tetramers of Some Olefin Oxides by R. S. Kern, J. Org. Chem., Vol. 33, pp. 388–390, 1968, British Pat. 785,229 and 1,108,921.

Suitable halogenated aliphatic compounds having a boiling point above about 150° C. which are employed as the modifier compound in the present invention include, for example, such chlorinated aliphatic compounds as hexachlorobutadiene, tetrachlorobutadiene, 1,2,3,3-tetrachlorobutane, 1,2,3-trichloropropene, polyepichlorohydrin diol having an equivalent weight above about 700 up to about 4000, chlorinated paraffins, e.g. Chlorowax #40, 1-mercapto-3-chloropropanol-2, 3-chloropropane-1,2-diol, 2-chloropropane, 1,3-diol, 1,3-dichloro-2-propanol, mixtures thereof and the like.

Suitable cyclic sulfones which are employed as the liquid modifier compound include the 5-membered cyclic sulfones such as, for example, 3-methylsulfolane (3-methyltetrahydrothiophene-1,1-dioxide) and the like.

Suitable fatty acids and naturally occurring fatty oils which may be employed as the liquid modifier compounds (component C) in the present invention includes, for example, oleic acid, linoleic acid, linolenic acid, and the like. The fatty acids resulting from the hydrolysis of naturally occurring oils of animal and vegetable origin including for example, linseed oil, castor oil, tung oil, fish oil, soya oil and the like and such acids as are produced as by-products in chemical processes including for example, tall oil, the by-product resulting from the conversion of wood pulp to paper by the sulfate process, mixtures of any of the above and the like.

Also operable as the liquid modifier compound are the naturally occurring fatty oils having boiling points above about 150° C. including, for example, linseed oil, castor oil, tung oil, fish oil, soya oil, and the like.

Suitable esters of a carboxylic acid which may be employed as liquid modifiers in the present invention include those esters prepared from mono- and polycarboxylic acids having from about 1 to about 20 carbon atoms such as for example, phthalic, adipic, acetoacetic, formic, acetic, abietic, acids, and the like and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150° C. and is a liquid at room temperature.

These acid esters may be prepared by condensing an acid having from about 1 to about 20 carbon atoms with a saturated or unsaturated aliphatic alcohol having from about 1 to about 20 carbon atoms, with the proviso that the ester product is a liquid and has a B.P. >150° C.

The term "liquid modifier boiling above about 150° C." includes eutectic mixtures of the previously described classes of compounds which are solids at atmospheric pressure but said eutectic mixtures are a liquid at room temperature and atmospheric pressure which have boiling points above about 150° C. Also included in the definition are those solid compounds of the classes previously described which are dissolved in a liquid member of any of the described classes of compounds having boiling points above about 150° C. wherein the resultant solution is a liquid at standard conditions of temperature and pressure and have boiling points at atmospheric pressure above about 150° C.

The following examples are illustrative of the present invention but are not to be construed as to limiting the scope thereof in any manner.

In each of the following examples and comparative experiments all the components except the catalyst, when employed, were blended together and then the catalyst was added and after blending, the resultant foamable mixture poured into an open top container where it was allowed to expand. The foam components and properties of the resultant foams are given in the following table.

TABLE I

| | Example 1 | Comparative Experiment A | Example 2 | Example 3 | Comparative Experiment B | Example 4 |
|---|---|---|---|---|---|---|
| Polyol, type/gms | A/30 | A/30 | A/30 | A/30 | A/30 | A/30. |
| Isocyanate, type/gms | A/30 | A/30 | A/30 | A/30 | A/30 | A/30. |
| Catalyst, type/gms | A/1 | A/1 | B/1 | B/1 | B/1 | B/0.5. |
| Foaming Agent, type/gms | A/5 | B/5 | A/5 | C/2 | D/2 | E/20. |
| Min. dimension, mm | <2 | 0.3 | <2 | <2 | <2 | <2. |
| Surface area, m.²/gms | 3.29 | <0.1 | 3.29 | 159 | <0.2 | 0.33. |
| Modifier, type/gms | A/30 | A/30 | A/30 | A/30 | A/30 | A/20. |
| Silicone oil cell control agent | None | None | None | None | None | None. |
| Foam time,ᵃ sec | 20 | 20ᶜ | | | 40ᶜ | 55. |
| Density | 0.55 g./cc | 1.13 g./cc | 0.42 g./cc | 0.54 g./cc | 1.02 g./cc | 0.59 g./cc. |
| Percent expansion ᵇ | ca.100 | <10 | ca.140 | ca.100 | <10 | ca.100. |
| Foam type ᵉ | R | | R | R | | R. |
| Flexural strength, p.s.i | N.D.ᵉ | N.D | N.D | N.D | N.D | N.D. |
| Modulus of elasticity in flexure, p.s.i | N.D | N.D | N.D | N.D | N.D | N.D. |
| Compressive yield strength, p.s.i | N.D | N.D | N.D | N.D | N.D | N.D. |

| | Comparative Experiment C | Example 5 | Example 6 | Example 7 | Example 8 | Example 9 |
|---|---|---|---|---|---|---|
| Polyol, type/gms | A/30 | B/13, C/75.5 | A/30 | A/30 | A/30 | A/30. |
| Isocyanate, type/gms | A/30 | B/55 | A/30 | A/30 | A/30 | A/30. |
| Catalyst, type/gms | B/0.5 | C/1 | B/1 | B/1 | D/1 | A/1. |
| Foaming agent, type/gms | F/20 | G/10 | H-1/30 | H-2/30 | I/10 | J/5. |
| Min. dimension, mm | <0.4 | <2 | 2 | <0.2 | <2 | <2. |
| Surface area, m.²/gms | <0.2 | 1.06 | 3.8 | 3.8 | 2 | 11.6. |
| Modifier, type/gms | A/30 | B/13.8 | A/30 | A/30 | C/10 | A/5. |
| Silicone oil cell control agent | | | | | | |
| Foam time,ᵃ sec | 50ᶜ | 60 | 45 | 45 | 45 | 30. |
| Density | 1.01 g./cc | 6 lbs./ft.³ | 0.71 g./cc | 0.27 g./cc | 0.29 g./cc | 2 lbs./ft.³ |
| Percent expansion ᵇ | <10 | ca.900 | ca.40 | >200 | >200 | ca.3,000. |
| Foam type ᵉ | | F | R | R | R | R. |
| Flexural strength, p.s.i | N.D | N.D | N.D | N.D | N.D | N.D. |
| Modulus of elasticity in flexure, p.s.i | N.D | N.D | N.D | N.D | N.D | N.D. |
| Compressive yield strength, p.s.i | N.D | N.D | N.D | N.D | N.D | N.D. |

| | Example 10 | Example 11 | Example 12 | Example 13 | Example 14 | Example 15 |
|---|---|---|---|---|---|---|
| Polyol, type/gms | A/33 | D/30 | E/30 | E/30 | E/30 | E/30. |
| Isocyanate, type/gms | A/35 | C/36 | D/46 | D/46 | E/30 | D/46. |
| Catalyst, type/gms | B/1 | None | D/1 | D/1 | A/0.5 | D/1. |
| Foaming agent, type/gms | K/5 | G/10 | L/80 | M/5 | N/10 | O/15. |
| Min. dimension, mm | <1 | <2 | <.2 | <1 | <1 | <.2. |
| Surface area, m.²/gms | 5.75 | 1.06 | 6.1 | 2.4 | 2.4 | 4.3. |
| Modifier, type/gms | D/10 | D/30 | None | None | None | None. |
| Silicone oil cell control agent | None | None | None | None | None | None. |
| Foam time,ᵃ sec | 45 | 30 | 45 | 30 | 30 | 90. |
| Density | 5.75 lbs./ft.³ | 5.9 lbs./ft.³ | 20 lbs./ft.³ | 13.8 lbs./ft.³ | 16 lbs./ft.³ | 13 lbs./ft.³ |
| Percent expansion ᵇ | >900 | >900 | >200 | >300 | >200 | >400. |
| Foam type ᵉ | R | R | R | R | R | R. |
| Flexural strength, p.s.i | N.D | N.D | N.D | N.D | N.D | N.D. |
| Modulus of elasticity in flexure, p.s.i | N.D | N.D | N.D | N.D | N.D | N.D. |
| Compressive yield strength, p.s.i | N.D | N.D | N.D | N.D | N.D | N.D. |

| | Example 16 | Example 17 | Example 18 | Example 19 | Example 20 |
|---|---|---|---|---|---|
| Polyol, type/gms | E/30 | A/30 | A/300 | A/300 | A/30. |
| Isocyanate, type/gms | D/46 | A/30 | A/300 | A/300 | A/30. |
| Catalyst, type/gms | D/1 | B/1 | D/2 | B/5 | D/1. |
| Foaming agent, type/gms | P/4 | Q/30 | R/10, S/100 | R/10, S/100 | T/10. |
| Min. dimension, mm | <1 | <.2 | <2, <1 | <2, <1 | <1. |
| Surface area, m.²/gms | 1.1 | 0.6 | 0.7, 2.5 | 0.7, 2.5 | 0.6. |
| Modifier, type/grams | None | None | None | None | A/10. |
| Silicone oil cell control agent | None | None | 10 gms | 10 gms | None. |
| Foam time,ᵃ sec | 40 | 45 | 120 | 25 | 120. |
| Density | 11 lbs./ft.³ | 0.38 g./cc | 17.7 lbs./ft.³ | 11.2 lbs./ft.³ | 0.33 g./cc. |
| Percent expansion ᵇ | >400 | >150 | >200 | >400 | >200. |
| Foam type ᵉ | R | R | R | | R. |
| Flexural strength, p.s.i | N.D | N.D | 515 | 204 | N.D. |
| Modulus of elasticity in flexure, p.s.i | N.D | N.D | 19,200 | 5,100 | N.D. |
| Compressive yield strength, p.s.i | N.D | N.D | 706 | 156 | N.D. |

See footnote at end of table.

TABLE I—Continued

| | Example 21 | Example 22 | Example 23 | Example 24 | Example 25 | Example 26 |
|---|---|---|---|---|---|---|
| Polyol, type/gms | F/68 | A/30 | A/30 | A/30 | A/30 | A/30. |
| Isocyanate, type/gms | D/45 | A/30 | A/30 | A/30 | A/30 | A/30. |
| Catalyst, type/gms | D/1 | E/.4 | D/1 | D/1 | D/1 | D/.1. |
| Foaming agent, type/gms | U/3 | V/30 | W/1 | X/3 | Y/9 | Z/1. |
| Min. dimension, mm | <1 | 0.1 | <.2 | <2 | <2 | <2. |
| Surface area, m.²/gms | 0.7 | 142 | 4.7 | 0.8 | 1.0 | 66.4. |
| Modifier, type/gms | None | None | None | None | None | None. |
| Silicone oil cell control agent | None | None | 3 gms | 3 gms | 3 gms | None. |
| Foam time,ᵃ sec | 180 | 20 | 40 | 40 | 40 | 40. |
| Density | 0.18 g./cc | 0.035 g./cc | 0.25 g./cc | 0.262 g./cc | 0.27 g./cc | 0.3 g./cc. |
| Percent expansion ᵇ | >400 | >2,000 | >300 | >200 | >200 | >200. |
| Foam type ᵉ | SF | R | R | R | R | R. |
| Flexural strength, p.s.i | N.D | N.D | N.D | N.D | N.D | N.D. |
| Modulus of elasticity in flexure, p.s.i | N.D | N.D | N.D | N.D | N.D | N.D. |
| Compressive yield strength, p.s.i | N.D | N.D | N.D | N.D | N.D | N.D. |

ᵃ Foam time was the time from completion of mixing to completion of expansion and to set to a non-tacky state.
ᵇ The amount of increase in volume in terms of percent expansion was calculated as follows:

$$\text{Percent expansion} = 100 \times \frac{\text{final vol. (after expansion)} - \text{initial vol. (before expansion)}}{\text{initial volume}}$$

ᶜ No expansion, time reported was the time for the mixture to solidify.
ᵈ Employed as an accelerator to initiate the reaction by the generation of exothermic heat by reaction with the isocyanate.
ᵉ R = Rigid, F = flexible, SF = semi-flexible.
ᶠ Employed also as a compatibilizer.
ᵍ N.D. = property was not determined.

The components employed in the preceding examples and comparative experiments were as follows.

POLYOL

Polyol A was the reaction product of glycerine with propylene oxide in a molar ratio of about 1 to 3 respectively and having a molecular weight of about 260.

Polyol B was the reaction product of p,p'-isopropylidine diphenol with ethylene oxide in a molar ratio of about 1 to 6 respectively and having an OH equivalent weight of about 264 and about 6.44 wt. percent OH.

Polyol C was the reaction product of glycerine with propylene oxide endcapped with ethylene oxide and containing about 14% by weight of ethylene oxide and having an OH equivalent weight of about 1560.

Polyol D was the reaction product of propylene oxide with aminoethylethanolamine and having an OH equivalent weight of about 72, percent OH=24.1.

Polyol E was tripropylene glycol.

Polyol F was a polyester polyol prepared from triethylene glycol and adipic acid having an OH equivalent wt. of about 197 and a percent OH of about 8.57.

ISOCYANATE

Polyisocyanate A was an 80/20 mixture of the 2,4-/2,6-isomers of toluene diisocyanate having an NCO equivalent weight of about 87.

Polyisocyanate B was an NCO terminated prepolymer prepared by reacting Polyol A with polyisocyanate B in a molar ratio of about 7.2 to 1 respectively and having a percent free NCO of about 31.8 and an NCO equivalent weight of about 130.

Polyisocyanate C was an isocyanate blend having an average NCO functionality of 2.3, an equivalent weight of 105, an NCO content of approximately 40 weight percent and is sold as Mondur® MT-40.

Polyisocyanate D was polymethylene polyphenyl isocyanate having an average NCO functionality of about 2.8 and an average NCO equivalent weight of about 134.

FOAMING AGENT

Foaming Agent A was a leafing grade aluminum flake powder having a minimum dimension size of less than about 2 mm. and a surface area of about 3.29 m.²/gram.

Foaming Agent B was aluminum shot having an average diameter of about 0.3 mm. and a surface area of less than 0.1 m.²/gram.

Foaming Agent C was a silica having a minimum dimension of less than about 2 mm. and a surface area of about 159 m.²/gram.

Foaming Agent D was a silica (white sand) having a minimum dimension of less than 2 millimeters and a surface area of less than 0.2 m.²/gram.

Foaming Agent E was a solution precipitated polyethylene powder having a surface area of 0.33 m.²/gram and a minimum dimension of less than 2 millimeters.

Foaming Agent F was polyethylene in "miniplate" form having a minimum dimension of less than 0.4 mm. and a surface area of less than 0.2 m.²/gram.

Foaming Agent G was pecan shell flour having a minimum dimension of less than 1 millimeter and a surface area of 1.06 m.²/gram.

Foaming Agents H were anhydrous calcium sulfate (Drierite) having about the same surface area, i.e. about 3.8 m.²/gram and various minimum dimensions as follows.

H-1 had a minimum dimension of about 2 millimeters.

H-2 had a minimum dimension of about less than 0.2 millimeter.

Foaming Agent I was a short fibered asbestos having a surface area of 2 m.²/gram and a minimum dimension of less than 2 mm.

Foaming Agent J was powdered Nylon-6 having a surface area of 11.6 m.²/gram and a minimum dimension of less than 2 mm.

Foaming Agent K was cellulose having a minimum dimension of less than 1 mm. and a surface area of 5.75 m.²/gram.

Foaming Agent L was an electrolytic iron powder having a surface area of 6.1 m.²/gram and a minimum dimension of less than 0.2 mm.

Foaming Agent M was ground flake mica powder having a surface area of 2.4 m.²/gram and a minimum dimension of less than 1 mm.

Foaming Agent N was powdered rosin having a surface area of 2.4 m.²/gram and a minimum dimension of less than 1 mm.

Foaming Agent O was powdered talc having a surface area of 4.3 m.²/gram and a minimum dimension of less than 0.2 mm.

Foaming Agent P was a leafing grade powdered bronze metal having a surface area of about 1.1 m.²/gram and a minimum dimension of about less than 1 mm.

Foaming Agent Q was powdered silicon metal having an average surface area of 0.6 m.²/gram and a minimum dimension of less than 0.2 mm.

Foaming Agent R was wood flour having a surface area of 0.7 m.²/gram and a minimum dimension of less than 2 mm.

Foaming Agent S was diatomaceous earth having a surface area of 2.5 m.²/gram and a minimum dimension of less than 1 mm.

Foaming Agent T was powdered confectioners sugar having a surface area of 0.6 m.²/gram and a minimum dimension of less than 1 mm.

Foaing Agent U was a cellulose powder having a surface area of 0.7 m.²/gram and a minimum dimension of less than 1 mm.

Foaming Agent V was an activated alumina having a surface area of 142 m.²/gram and a minimum dimension of less than 0.1 mm. diameter.

Foaming Agent W was powdered zinc stearate having a surface area of about 4.7 m.²/gram and a minimum dimension of less than 0.2 mm.

Foaming Agent X was a polyurethane foam dust having a surface area of about 0.8 m.²/gram and a minimum dimension of less than 2.0 mm.

Foaming Agent Y was a powdered polytetrafluoroethylene having a surface area of about 1 m.²/gram and a minimum dimension of less than 2.0 mm.

Foaming Agent Z was boron nitride powder having a surface area of about 66.4 m.²/gram and a minimum dimension of less than 2.0 mm.

MODIFIER COMPOUND

Modifier A was dioctylphthalate.
Modifier B was diethylene glycol.
Modifier C was ethylacetoacetate.
Modifier D was the reaction product of glycerine with propylene oxide and having a molecular weight of about 1500.

CATALYST

Catalyst A was a commercial stannous octoate.
Catalyst B was commercial dibutyltindilaurate.
Catalyst C was dibutyltin-2-ethylhexoate.
Catalyst D was a 33% solution of triethylenediamine in dipropylene glycol.
Catalyst E was a commercial lead octoate containing 24% Pb.

We claim:

1. A polyurethane foam prepared from a composition comprising
   (A) a polyhydric polyol or polyol mixture having an average OH functionality of from about 2 to about 8 and an equivalent weight of from about 40 to about 500,
   (B) an organic polyisocyanate having an average NCO functionality of at least about 2,
   (C) as the sole blowing agent therefor, a solid particulate substance having a particle size in its minimum dimension of less than about 2 millimeters and a surface area of at least about 0.2 square meters per gram, is substantially insoluble in either component (A) or (B) and has a decomposition temperature above the exothermic temperature of the reaction between components (A) and (B),
wherein components (A) and (B) are present in quantities so as to provide an NCO:OH ratio of from about 0.8:1 to about 1.5:1, component (C) is employed in quantities of from about 1 to about 80 percent by weight based upon the combined weights of components (A) and (B) with the proviso that when component (A) has a functionality of about 2, component (B) has an average functionality of about 2.5 and when component (B) has a functionality of 2 then component (A) has an average functionality of at least about 3.

2. The polyurethane foam of claim 1 wherein components (A) and (B) are present in quantities so as to provide an NCO:OH ratio of from about 0.9:1 to about 1.2:1, component (C) has a surface area of at least about 1 square meter per gram and a particle size in the minimum dimension of less than about 1 millimeter.

3. The polyurethane foam of claim 2 wherein component (A) is a polyester polyol.

4. The polyurethane foam of claim 2 wherein component (A) is a polyether triol.

5. The polyurethane foam of claim 2 wherein component (C) is a metal powder.

6. The polyurethane foam of claim 5 wherein the metal powder is aluminum, iron, silicon or bronze.

7. The polyurethane foam of claim 2 wherein component (C) is an organic polymer.

8. The polyurethane foam of claim 7 wherein the organic polymer is nylon or an olefin polymer.

9. The polyurethane foam of claim 8 wherein the olefin polymer is polyethylene.

10. The polyurethane foam of claim 2 wherein component (C) is wood flour, pecan shell flour, asbestos, mica, rosin, sugar, calcium sulfate, diatomaceous earth or rosin.

11. In a process for preparing a polyurethane, a polyol and a polyisocyanate in the presence of a foaming agent, the improvement which comprises employing as the foaming agent therein a solid particulate substance which has a decomposition or dehydration temperature above the exothermic reaction temperature and which has a minimum dimension particle size of less than about 2 millimeters and a surface area of at least about 0.2 square meters per gram and is substantially insoluble in either the polyol or the polyisocyanate.

12. The process of claim 11 wherein the solid particulate foaming agent has a minimum dimension particle size below about 1 millimeter and a surface area of at least about 1 square meter per gram.

References Cited

UNITED STATES PATENTS 3,640,920   2/1972   Cear _____ 260—2.5 A K

OTHER REFERENCES

Perry et al. (ed.), Chemical Engineer's Handbook, McGraw-Hill, New York, 1963, pp. 4–12.

DONALD E. CZAJA, Primary Examiner

M. J. WELSH, Assistant Examiner

U.S. Cl. X.R.

260—2.5 A K

PO-1050
(5/69)

UNITED STATES PATENT OFFICE
CERTIFICATE OF CORRECTION

Patent No. 3,753,933    Dated Aug. 21, 1973

Inventor(s) Franciszek Olstowski and Donald B. Parrish

It is certified that error appears in the above-identified patent and that said Letters Patent are hereby corrected as shown below:

Col. 4, line 21, delete "of", first occurrence, and insert therefor --or--.

Col. 4, line 30, delete "is", first occurrence, and insert therefor --if--.

Col. 4, line 75, delete "aboua" and insert therefor --about--.

Col. 5, lines 40-43, please delete the formula and substitute the following formula $$-- \quad Z \left( O-CH_2-CH \atop R_1 \right)_{x_1} \left( O-CH_2-CH \atop R_2 \right)_{x_2} \cdots \left( O-CH_2-CH \atop R_n \right)_{x_n} OH_q \quad --.$$

Signed and sealed this 12th day of March 1974.

(SEAL)
Attest:

EDWARD M. FLETCHER, JR.
Attesting Officer

C. MARSHALL DANN
Commissioner of Patents